United States Patent
Hoshino et al.

(10) Patent No.: US 8,755,755 B2
(45) Date of Patent: Jun. 17, 2014

(54) RADIO COMMUNICATION SYSTEM, RADIO COMMUNICATION APPARATUS, AND RADIO COMMUNICATION METHOD

(75) Inventors: Masayuki Hoshino, Kanagawa (JP); Katsuhiko Hiramatsu, Leuven (BE)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 12/532,555

(22) PCT Filed: Mar. 28, 2008

(86) PCT No.: PCT/JP2008/000801
§ 371 (c)(1),
(2), (4) Date: Sep. 22, 2009

(87) PCT Pub. No.: WO2008/126378
PCT Pub. Date: Oct. 23, 2008

(65) Prior Publication Data
US 2010/0103044 A1    Apr. 29, 2010

(30) Foreign Application Priority Data
Mar. 30, 2007    (JP) ................................. 2007-094569

(51) Int. Cl.
*H04B 1/00* (2006.01)
*H04B 7/00* (2006.01)
*H04B 7/24* (2006.01)

(52) U.S. Cl.
USPC ............................................. 455/69; 455/39

(58) Field of Classification Search
None
See application file for complete search history.

(56) References Cited

U.S. PATENT DOCUMENTS

| 4,178,550 A * | 12/1979 | Acampora et al. ............ 714/794 |
| 6,054,949 A * | 4/2000 | Grassmann .................... 342/383 |
| 2003/0128658 A1 * | 7/2003 | Walton et al. ................. 370/208 |

(Continued)

FOREIGN PATENT DOCUMENTS

| JP | 2005-509316 A | 4/2005 |
| JP | 2006-197403 A | 7/2006 |
| JP | 2006197403 A * | 7/2006 |
| JP | 2006-520109 A | 8/2006 |

(Continued)

OTHER PUBLICATIONS

English Translation of JP 2006197403 A in pdf format, Murakami, Jul. 2006.*

(Continued)

*Primary Examiner* — Ajibola Akinyemi
*Assistant Examiner* — Ayodeji Ayotunde
(74) *Attorney, Agent, or Firm* — Pearne & Gordon LLP

(57) ABSTRACT

Reliability of beam selection by pre-coding is improved. A user terminal 52 selects an optimum beam (beam number 'b') in the next frame (t+1) based on the channel estimation value of a received pilot signal and transmits a difference value D (=b−a) between a beam number 'a' at the current transmission notified by a radio base station 51 and the selected beam number 'b' selected to be transmitted at the next transmission to the radio base station 51 as a feedback signal. The radio base station 51 previously stores the beam number 'a' notified at the previous transmission and combines the beam number based on the difference value D received as the received feedback signal and the previously notified beam number 'a' to restore the beam number 'b' desired by the user terminal 52. Pre-coding processing adapted to the beam number 'b' is performed and transmission to the user terminal 52 is executed in a state in which a beam of the appropriate beam number 'b' is formed.

20 Claims, 10 Drawing Sheets

(56) References Cited

U.S. PATENT DOCUMENTS

| | | | |
|---|---|---|---|
| 2003/0185309 A1* | 10/2003 | Pautler et al. | 375/257 |
| 2006/0039493 A1* | 2/2006 | Mukkavilli et al. | 375/267 |
| 2007/0155336 A1* | 7/2007 | Nam et al. | 455/69 |
| 2008/0080459 A1* | 4/2008 | Kotecha et al. | 370/342 |
| 2008/0080634 A1* | 4/2008 | Kotecha et al. | 375/267 |
| 2008/0108310 A1* | 5/2008 | Tong et al. | 455/69 |
| 2009/0046008 A1 | 2/2009 | Murakami et al. | |
| 2009/0055701 A1 | 2/2009 | Hoshino et al. | |

FOREIGN PATENT DOCUMENTS

| | | |
|---|---|---|
| WO | 2006/075453 A1 | 7/2006 |
| WO | 2006/104104 A1 | 10/2006 |

OTHER PUBLICATIONS

International Search Report for PCT/JP2008/000801.

Qualcomm et al; "MIMO proposal for MIMO-WCDMA evaluation", 3GPP TSG-RAN WG1 #42 R1-050912.

\* cited by examiner

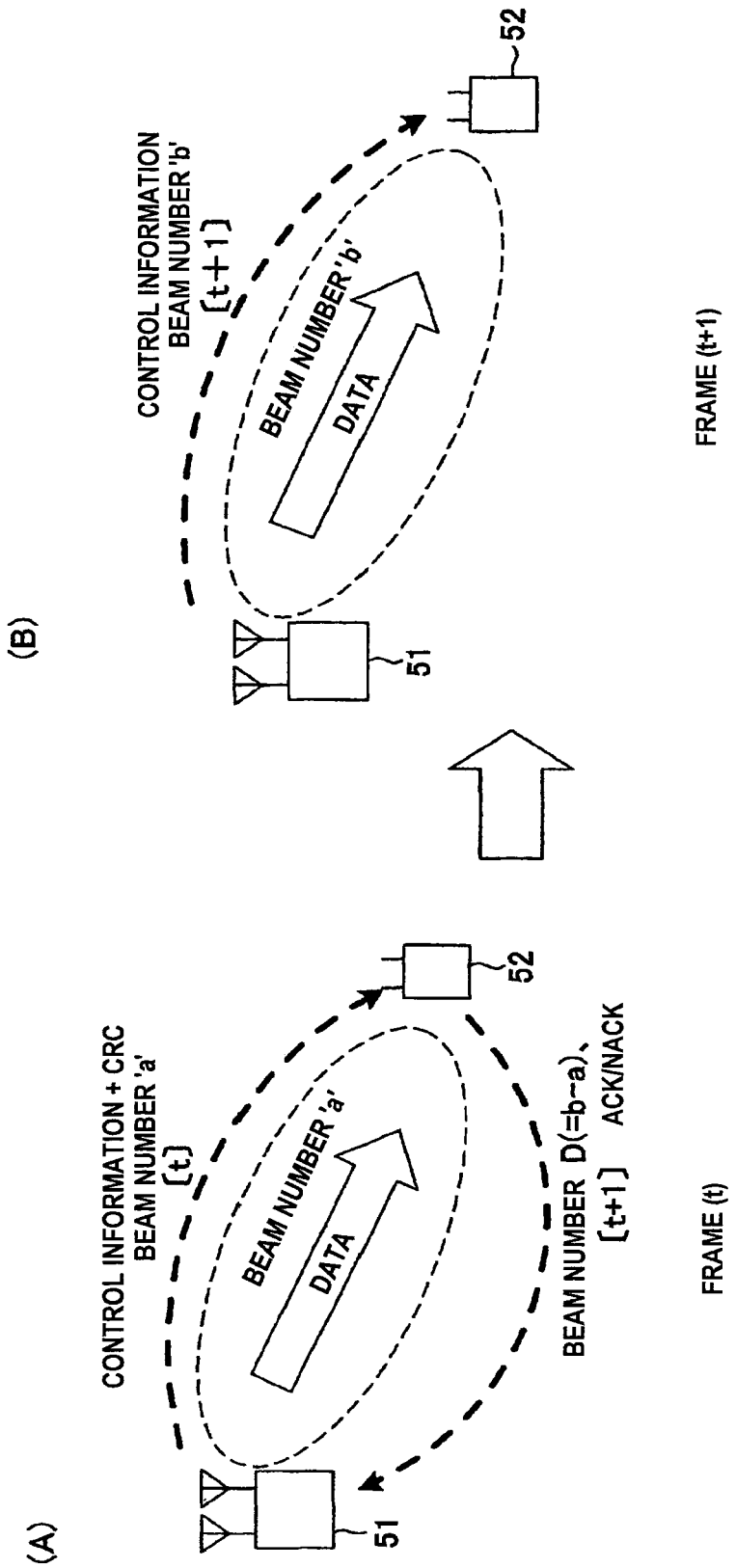

FIG.5A

| ID | BEAM NUMBER |
|---|---|
| 0000 | BEAM 'a' |
| 0001 | BEAM 'b' |
| ... | ... |
| 1110 | BEAM 'n-1' |
| 1111 | BEAM 'n' |

FIG.5B

| ID | BEAM NUMBER |
|---|---|
| 0000 | keep (BEAM NUMBER) ±0 |
| 0001 | |
| 0010 | BEAM NUMBER +1 |
| 0011 | |
| ... | ... |

FIG.6A

| ID | BEAM NUMBER |
|---|---|
| 0000 | BEAM 'a' |
| ... | ... |
| 0011 | BEAM 'd' |
| ... | ... |
| 1110 | BEAM 'n-1' |
| 1111 | BEAM 'n' |

FIG.6B

| ID | BEAM NUMBER |
|---|---|
| 0000 | BEAM 'a' |
| ... | ... |
| 1100 | BEAM 'd' |
| ... | ... |
| 1011 | BEAM 'n-1' |
| 1111 | BEAM 'n' |

FEEDBACK SIGNAL
(BEAM NUMBER)

RADIO COMMUNICATION SYSTEM, RADIO COMMUNICATION APPARATUS, AND RADIO COMMUNICATION METHOD

TECHNICAL FIELD

The present invention relates to a radio communication system, a radio communication apparatus, and a radio communication method that can be applied to MIMO (Multiple-Input Multiple-Output), etc., for conducting communications using a plurality of antennas.

BACKGROUND ART

In recent years, attention has been focused on MIMO (Multiple-Input Multiple-Output) as an art for realizing high-speed large-capacity communications in a radio communication technology. The MIMO is an art of transmitting data using a plurality of antennas in both transmission and reception. Different data are transmitted from a plurality of transmission antennas respectively, whereby the transmission capacity can be enhanced without enlarging the time and frequency resources.

In the MIMO, when data are transmitted from a plurality of antennas, a beam transmission method of forming a beam by transmitting weighted data from each antenna is available. The beam transmission has the advantage that the reception power of a terminal is increased due to the beam gain.

Spatial multiplexing using a plurality of beams is also possible, in which case beam transmission suited for the state of a propagation path is performed, whereby the transmission capacity can be improved as compared with spatial multiplexing using antennas. In this case, it is necessary to send information of a beam suited for the propagation path state of the receiving party to the transmitting party.

At present, in 3GPP (3rd Generation Partnership Project) of an international standardization organization of mobile telephones, standardization activity of an LTE (Long Term Evolution) system is carried out as a system for realizing higher-speed larger-capacity communications than communications of the current third generation mobile telephone. Also in the LTE, the MIMO is positioned as an indispensable technology to meet the required condition for high-speed large-capacity transmission. In the LTE, the transmission beam technology is discussed as a technology of pre-coding.

FIG. 11 schematically shows transmission beam formation by pre-coding. For example, to use it for a cellular system for mobile communications of mobile telephones, etc., when a signal is transmitted through multiple antennas from a radio base station 101, the beam number indicating the optimum beam pattern in a user terminal 102 is set according to a feedback signal from the user terminal 102 of a mobile station. The radio base station 101 weights the transmission signal of each antenna in response to the beam number, thereby forming a transmission beam 103 which becomes a beam pattern in an appropriate direction for the receiving user terminal 103.

According to the pre-coding, a beam responsive to the feedback signal from the user terminal is selected for use among the stipulated beam patterns transmitted from the radio base station, whereby the signal strength when a signal is transmitted to the user terminal can be ensured, and in addition, it is made possible to transmit a plurality of signals at the same time using orthogonal beams. Thus, the advantages of coverage enlargement because of improvement in the signal strength and improvement in throughput because of space division can be expected. Such pre-coding is disclosed in non-patent document 1, for example.

In the pre-coding, to reflect the observation state (propagation path state) of a reception signal at the reception point, a beam is controlled using a feedback signal containing beam information transmitted from the receiving user terminal to the transmitting radio base station. In such a case, a feedback signal determination error may occur in the transmitting radio base station because of the factor of fading variation, etc., and in such a case, a beam is transmitted in an erroneous direction as a result of the determination error. Thus, if a determination error occurs in the feedback signal, an appropriate beam cannot be selected and thus the quality at the reception time in the user terminal cannot be ensured. Thus, it is feared that the transmitted data cannot be demodulated and throughput decrease may result. Particularly, for example, if the characteristic of the communication line between the transmitting radio base station and the receiving user terminal is asymmetric and sufficient reliability of the upload propagation path cannot be ensured because of fading, etc., as an error correction code is not contained in the upload communication line of feedback from the user terminal to the radio base station, etc., a determination error may occur in the radio base station.

Patent document 1: 3GPP TSG RAN WG1 #42, R1-050912, Qualcomm Europe, "MIMO proposal for MIMO-WCDMA evaluation", Aug. 29-Sep. 2, 2005

DISCLOSURE OF THE INVENTION

Problems to be Solved by the Invention

As described above, in the pre-coding, a beam is selected in the transmitting party using a feedback signal containing beam information determined in response to the propagation path state in the receiving party and an appropriate beam is formed. However, for example, it is assumed that the characteristic of the communication line between the transmitting radio base station and the receiving user terminal is asymmetric and sufficient reliability of the propagation path from the receiving user terminal to the transmitting radio base station cannot be ensured. When a determination error of the feedback signal occurs because of fading, etc., an appropriate beam cannot be selected. If the reliability of beam selection is thus degraded, there is a problem in that the communication quality at the reception time cannot be ensured because of transmission with an erroneous beam and throughput decreases.

In view of the circumstances, the invention has an object to provide a radio communication system, a radio communication apparatus, and a radio communication method capable of improving reliability of beam selection by pre-coding.

Means For Solving the Problems

A radio communication system according to an aspect of the invention is a radio communication system for conducting communications using a plurality of antennas, the radio communication system including:

a first radio communication apparatus used as a radio reception station including: a beam selector for receiving a signal from a radio transmission station and selecting a beam by pre-coding in future transmission in response to a state of a propagation path of the reception signal; a beam information generator for generating, as beam information relevant to the selected beam, beam information representing a relative value between beam information notified from the radio transmission station and beam information of the beam selected this time; and a feedback information transmitter for transmitting feedback information containing the generated beam information to the radio transmission station, and a second radio communication apparatus used as the radio transmission station including: a beam information acquirer for receiving the feedback information from the radio reception station and acquiring the beam information relevant to the beam selected by the radio reception station from the beam information representing the relative value; a pre-coding processor for performing pre-coding to form a predetermined beam by weighting signals to be output to a plurality of antennas based on the acquired beam information; a control information generator for generating control information containing beam information of the beam formed by the pre-coding; and a transmitter for transmitting the control information and the signal subjected to the pre-coding processing to the radio reception station.

Accordingly, the feedback information containing the beam information representing the relative value between the beam information notified from the radio transmission station and the beam information of the beam selected this time is transmitted from the radio reception station to the radio transmission station. And the beam information relevant to the beam selected by the radio reception station is acquired from the beam information representing the relative value. Therefore, the reliability of determination of the feedback information can be enhanced using the beam information notified from the radio transmission station to the radio reception station, and it is made possible to improve the reliability of beam selection by pre-coding so as to be able to acquire any desired propagation path state in the radio reception station.

The radio communication system described above according to the invention may have a configuration, wherein the characteristic of a communication line between the first radio communication apparatus and the second radio communication apparatus is asymmetric, and sufficient reliability of the propagation path of the communication line from the second radio communication apparatus used as the radio transmission station to the first radio communication apparatus used as the radio reception station is ensured.

Accordingly, it is made possible to further improve the reliability of beam selection by pre-coding by using the beam information notified to the radio reception station from the radio transmission station with sufficiently ensured reliability of the propagation path of the communication line.

A radio communication apparatus according to an aspect of the invention is a radio communication apparatus used in a radio communication system for conducting communications using a plurality of antennas, the radio communication apparatus including: a beam selector for receiving a signal from a radio transmission station and selecting a beam by pre-coding to form a predetermined beam by weighting a signal to be output to a plurality of antennas by the radio transmission station in future transmission in response to a state of a propagation path of the reception signal; a beam information generator for generating, as beam information relevant to the selected beam, beam information representing a relative value between beam information notified from the radio transmission station and beam information of the beam selected this time; and a feedback information transmitter for transmitting feedback information containing the generated beam information to the radio transmission station.

Accordingly, the reliability of determination of the feedback information can be enhanced by using the beam information notified to the radio reception station in the radio transmission station and it is made possible to improve the reliability of beam selection by pre-coding.

The radio communication apparatus described above according to the invention may have a configuration, wherein the radio communication apparatus includes a control information demodulator for demodulating control information transmitted from the radio transmission station and acquiring the notified beam information from the control information, wherein the beam information generator has a code book for storing therein ID information and a beam number of the beam, and generates by referencing the code book, the beam information representing the relative value between the notified beam information and beam information of the beam selected this time.

The radio communication apparatus described above according to the invention may have a configuration, wherein the beam information generator includes a first code book for first transmission and a second code book for second transmission as the code book and has the beam information representing the relative value in the second code book.

Accordingly, it is made possible to refer to the code book and generate the beam information representing the relative value between the notified beam information and the beam information of the beam selected this time.

The radio communication apparatus described above according to the invention may have a configuration, wherein the beam information generator calculates a difference between the beam information notified from the radio transmission station and the beam information of the beam selected this time, and generates beam information based on a value of the difference.

Accordingly, the beam information based on the difference value between the beam information notified from the radio transmission station and the beam information of the beam selected this time is used, whereby it is made possible to enhance the reliability of determination of the feedback information using the beam information notified to the radio reception station in the radio transmission station.

The radio communication apparatus described above according to the invention may have a configuration, wherein the beam information generator generates the beam information of the beam selected this time according to information provided by bit-shifting the beam information notified from the radio transmission station.

Accordingly, the beam information based on information provided by bit-shifting the beam information notified from the radio transmission station is used, whereby it is made possible to enhance the reliability of determination of the feedback information using the beam information notified to the radio reception station in the radio transmission station.

A radio communication apparatus according to an aspect of the invention is a radio communication apparatus used in a radio communication system for conducting communications using a plurality of antennas, the radio communication apparatus including: a beam information acquirer for receiving the feedback information from the radio reception station to which a signal is to be transmitted and acquiring beam information relevant to a beam selected by the radio reception station from beam information, contained in the feed back information, representing a relative value with respect to beam information notified to the radio reception station; a pre-coding processor for performing pre-coding to form a predetermined beam by weighting signals to be output to a plurality of antennas based on the acquired beam information; a control information generator for generating control information containing beam information of the beam formed by the pre-coding; and a transmitter for transmitting the control information and the signal subjected to the pre-coding processing to the radio reception station.

Accordingly, the reliability of determination of the feedback information can be enhanced by using the beam information notified to the radio reception station and it is made possible to improve the reliability of beam selection by pre-coding.

The radio communication apparatus described above according to the invention may have a configuration, wherein the beam information acquirer includes a notified beam information storage for storing therein the beam information notified to the radio reception station, and acquires beam information relevant to the beam selected by the radio reception station from the stored beam information and the beam information representing the relative value, and outputs the beam information to the pre-coding processor.

Accordingly, the beam information relevant to the beam selected by the radio reception station can be acquired from the stored beam information notified to the radio reception station and the beam information representing the relative value and it is made possible to enhance the reliability of determination of the feedback information.

The invention provides a radio communication mobile station apparatus including any of the radio communication apparatus described above.

The invention provides a radio communication base station apparatus including any of the radio communication apparatus described above.

A radio communication method according to an aspect of the invention is a radio communication method in a radio communication system for conducting communications using a plurality of antennas, the radio communication method including: a beam selecting step of receiving a signal from a radio transmission station and selecting a beam by pre-coding in future transmission in response to a state of a propagation path of the reception signal; a beam information generating step of generating, as beam information relevant to the selected beam, beam information representing a relative value between beam information notified from the radio transmission station and beam information of the beam selected this time; a feedback information transmitting step of transmitting feedback information containing the generated beam information to the radio transmission station; a beam information acquiring step of receiving the feedback information from the radio reception station and acquiring the beam information relevant to the beam selected by the radio reception station from the beam information representing the relative value; a pre-coding processing step of performing pre-coding to form a predetermined beam by weighting signals to be output to a plurality of antennas based on the acquired beam information; a control information generating step of generating control information containing beam information of the beam formed by the pre-coding; and a transmitting step of transmitting the control information and the signal subjected to the pre-coding processing to the radio reception station.

Accordingly, the reliability of determination of the feedback information can be enhanced using the beam information notified from the radio transmission station to the radio reception station and it is made possible to improve the reliability of beam selection by pre-coding.

The invention can also provide a radio communication system for conducting communications using a plurality of antennas, the radio communication system including:

a first radio communication apparatus used as a radio reception station including: a beam selector for receiving a signal from a radio transmission station and selecting a beam by pre-coding in future transmission in response to a state of a propagation path of the reception signal; a beam information generator for generating, as beam information relevant to the selected beam, the same beam information as the previous beam information if beam information notified from the radio transmission station differs from beam information specified by the own station; and a feedback information transmitter for transmitting feedback information containing soft combining command information for giving a soft combining command with the generated beam information to the radio transmission station if the beam information notified from the radio transmission station differs from the beam information specified by the own station; and a second radio communication apparatus used as a radio transmission station including: a soft combiner for receiving the feedback information from the radio reception station and performing soft combining of a soft determination value of the previous received beam information and the beam information received this time if the soft combining command information is contained in the feedback information; a beam information acquirer for acquiring beam information relevant to the beam selected by the radio reception station from a result of the soft combining; a pre-coding processor for performing pre-coding to form a predetermined beam by weighting signals to be output to a plurality of antennas based on the acquired beam information; a control information generator for generating control information containing beam information of the beam formed by the pre-coding; and a transmitter for transmitting the control information and the signal subjected to the pre-coding processing to the radio reception station.

The invention can also provide a radio communication apparatus used in a radio communication system for conducting communications using a plurality of antennas, the radio communication apparatus including:

a beam selector for receiving a signal from a radio transmission station and selecting a beam by pre-coding to form a predetermined beam by weighting a signal to be output to a plurality of antennas by the radio transmission station in future transmission in response to a state of a propagation path of the reception signal; a beam information generator for generating, as beam information relevant to the selected beam, the same beam information as the previous beam information if beam information notified from the radio transmission station differs from beam information specified by the own station; and a feedback information transmitter for transmitting feedback information containing soft combining command information for giving a soft combining command with the generated beam information to the radio transmission station if the beam information notified from the radio transmission station differs from the beam information specified by the own station.

The invention can also provide a radio communication apparatus used in a radio communication system for conducting communications using a plurality of antennas, the radio communication apparatus including:

a soft combiner for receiving the feedback information from the radio reception station and performing soft combining of a soft determination value of the previous received beam information and the beam information received this time if soft combining command information for commanding a soft combining is contained in the feedback information; a beam information acquirer for acquiring beam information relevant to the beam selected by the radio reception station from a result of the soft combining; a pre-coding processor for performing pre-coding to form a predetermined beam by weighting signals to be output to a plurality of antennas based on the acquired beam information; a control information generator for generating control information containing beam information of the beam formed by the pre-coding; and a transmitter for transmitting the control information and the signal subjected to the pre-coding processing to the radio reception station.

The invention can also provide a radio communication method in a radio communication system for conducting communications using a plurality of antennas, the radio communication method including:

a beam selecting step of receiving a signal from a radio transmission station and selecting a beam by pre-coding in future transmission in response to a state of a propagation path of the reception signal; a beam information generating step of generating, as beam information relevant to the selected beam, the same beam information as the previous beam information if beam information notified from the radio transmission station differs from beam information specified by the own station; a feedback information transmitting step of feedback information containing soft combining command information for giving a soft combining command with the generated beam information to the radio transmission station if the beam information notified from the radio transmission station differs from the beam information specified by the own station; a soft combining step of receiving the feedback information from the radio reception station and performing soft combining of a soft determination value of the previous received beam information and the beam information received this time if the soft combining command information is contained in the feedback information; a beam information acquiring step of acquiring the beam information relevant to the beam selected by the radio reception station from a result of the soft combining; a pre-coding processing step of performing pre-coding to form a predetermined beam by weighting signals to be output to a plurality of antennas based on the acquired beam information; a control information generating step of generating control information containing beam information of the beam formed by the pre-coding; and a transmitting step of transmitting the control information and the signal subjected to the pre-coding processing to the radio reception station.

Advantages of the Invention

According to the invention, a radio communication system, a radio communication apparatus, and a radio communication method capable of improving reliability of beam selection by pre-coding can be provided.

BRIEF DESCRIPTION OF THE DRAWINGS

FIG. 4 shows an example of a beam forming operation by pre-coding in a radio communication system of the first embodiment.

FIGS. 5A and 5B show specific examples of code books stored in a code book storage of the reception station.

FIGS. 6A and 6B show examples of different forms of code books stored in the code book storage of the reception station.

Figure 1:
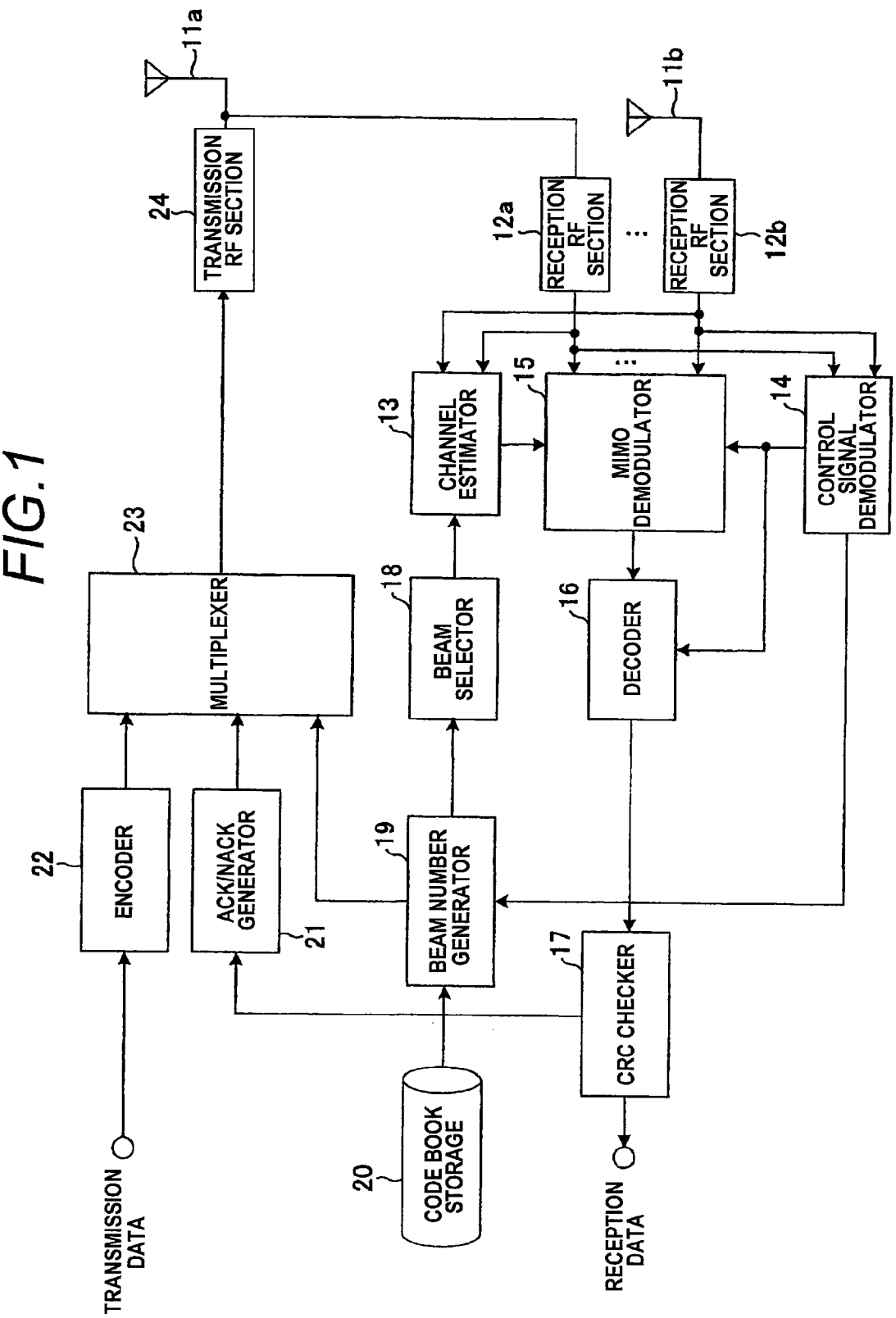
FIG. 1 is a block diagram to show the configuration of the main part of a reception station (reception apparatus) used in a first embodiment of the invention.

| Description of Reference Numerals | |
|---|---|
| 11a, 11b | Antenna |
| 12a, 12b | Reception RF section |
| 13 | Channel estimator |
| 14 | Control signal demodulator |
| 15 | MIMO demodulator |
| 16 | Decoder |
| 17 | CRC checker |
| 18 | Beam selector |
| 19 | Beam number generator |
| 20 | Code book storage |
| 21 | ACK/NACK generator |
| 22 | Encoder |
| 23 | Multiplexer |
| 24 | Transmission RF section |
| 25 | Beam number storage |
| 26 | Soft combining command bit assigner |
| 31 | Encoder |
| 32, 44 | Control signal generator |
| 33 | Multiplexer |
| 34, 45 | Code book information storage |
| 35 | Pre-coding processor |
| 36a, 36b | Transmission RF section |
| 37a, 37b | Antenna |
| 38 | Reception RF section |
| 39 | Separator |
| 40 | Demodulator/decoder |
| 41 | CRC checker |
| 42 | Soft determination value storage |
| 43 | Soft combiner |
| 51 | Radio base station |
| 52 | User terminal |

BEST MODE FOR CARRYING OUT THE INVENTION

In embodiments, configuration examples for performing pre-coding of weighting for a plurality of antennas and forming a beam in a radio communication system adopting MIMO are shown as examples of a radio communication system, a radio communication apparatus, and a retransmission control method according to the invention. The following embodiments are examples for description and the invention is not limited thereto.

First Embodiment

Figure 2:
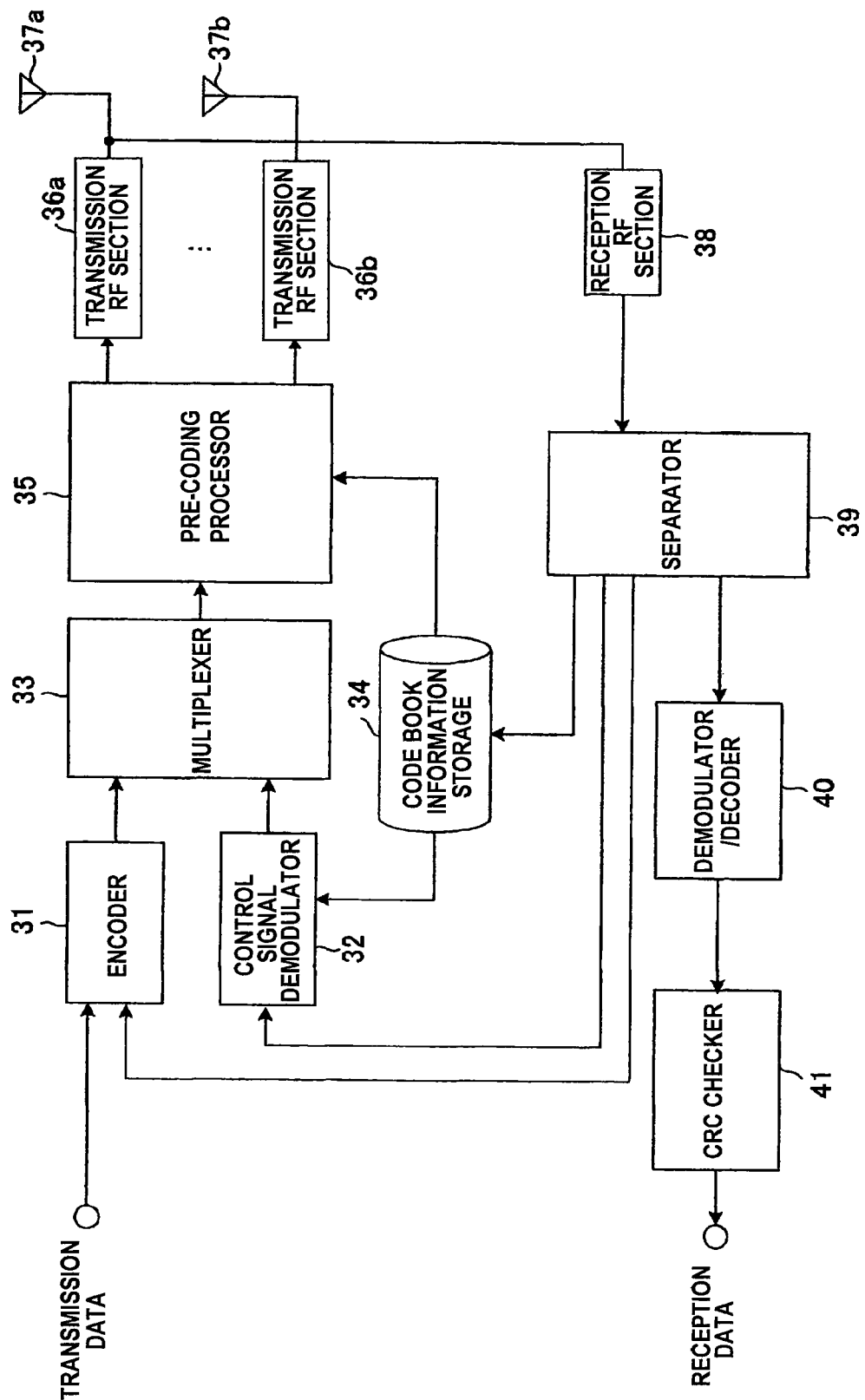
FIG. 2 is a block diagram to show the configuration of the main part of a transmission station (transmission apparatus) used in the first embodiment of the invention.

FIG. 1 is a block diagram to show the configuration of the main part of a reception station (reception apparatus) used in a first embodiment of the invention, and FIG. 2 is a block diagram to show the configuration of the main part of a transmission station (transmission apparatus) used in the first embodiment of the invention.

The embodiment assumes the case where radio communications are conducted using a radio wave between the reception station shown in FIG. 1 and the transmission station shown in FIG. 2. For example, it is assumed that the transmission station (transmission apparatus) shown in FIG. 2 is applied to a radio communication base station apparatus (radio base station, BS) of a cellular system for providing communication service of mobile communications of mobile telephones, etc., and the reception station (reception apparatus) shown in FIG. 1 is applied to a user terminal (UE: User Equipment) of a radio communication mobile station apparatus of a mobile telephone apparatus, etc. The description is predicated on configuring of an MIMO (Multiple-Input Multiple-Output antenna) system for performing radio transmission and reception using a plurality of antennas in both transmission and reception. For example, the case where communications are conducted according to a multicarrier communication system using an OFDM (Orthogonal Frequency Division Multiplexing) signal and sequential transmission is executed in packet units, etc., is assumed as the mode of a communication signal.

The reception station shown in FIG. 1 includes a plurality of antennas 11a and 11b, a plurality of reception RF sections 12a and 12b, a channel estimator 13, a control signal demodulator 14, a MIMO demodulator 15, a decoder 16, a CRC checker 17, a beam selector 18, a beam number generator 19, a code book storage 20, an ACK/NACK generator 21, a encoder 22, a multiplexer 23, and a transmission RF section 24.

A radio wave transmitted from a remote station (for example, the transmission station shown in FIG. 2) is received by the independent antennas 11a and 11b. The radio-frequency signal of the radio wave received at the antenna 11a is converted into a signal of a comparatively low frequency band such as a baseband signal in the reception RF section 12a and then the signal is subjected to processing of Fourier transform, parallel/serial conversion, etc., and is converted into a reception signal of serial data. Likewise, the radio-frequency signal of the radio wave received at the antenna 11b is converted into a signal of a comparatively low frequency band such as a baseband signal in the reception RF section 12b and then the signal is subjected to processing of Fourier transform, parallel/serial conversion, etc., and is converted into a reception signal of serial data. The outputs of the reception RF sections 12a and 12b are input to the channel estimator 13, the control signal demodulator 14, and the MIMO demodulator 15.

The channel estimator 13 executes channel estimation based on a pilot signal contained in the signal transmitted from each transmission antenna of the remote station (transmission station) and calculates a channel estimation value. The calculated channel estimation value is input to the MIMO demodulator 15 and the beam selector 18. The control signal demodulator 14 demodulates a control signal transmitted along with the pilot signal and extracts a transmission parameter indicating the modulation system, the coding rate, etc., of the transmission signal, the beam number indicating the beam pattern of the transmission signal, and the like. Of the demodulated control signal, the transmission parameter is input to the MIMO demodulator 15 and the decoder 16, and the beam number is input to the MIMO demodulator 15, the decoder 16, and the beam number generator 19. The beam information transmitted to and received from the remote station may be the beam number for determining each beam based on a number or a code, or ID information, etc. corresponding to the number may be used.

The MIMO demodulator 15 uses the channel estimation value received from the channel estimator 13 to perform demodulation processing of the reception signal corresponding to the own station. The MIMO demodulator 15 performs deinterleave processing, rate dematching processing so that the number of modulation multiple values and the coding rate match those of the transmitting party, likelihood combining processing of combining likelihood information of the past reception signal and likelihood information of the current reception signal, and the like. The decoder 16 performs decoding processing of the reception signal input from the MIMO demodulator 15 and restores the received data. The CRC checker 17 executes CRC (Cyclic Redundancy Check) check about the data output from the decoder 16 and checks whether or not a data error occurs. The CRC checker 17 outputs the data as reception data.

The beam selector 18 determines the reception state of the pilot signal based on the channel estimation value, selects any desired beam by pre-coding from the reception signal quality when the beam of each of the stipulated beam patterns transmitted from the remote station (transmission station) is assumed, and outputs the corresponding beam number.

The beam number generator 19 references the beam number received from the control signal demodulator 14 and makes a comparison between the beam number notified from the remote station (transmission station) contained in the control signal and the beam number output by the beam selector 18 to calculate a difference therebetween. The beam number generator 19 provides the function of a beam information generator. The difference value can represent the relative value of the beam number at the current transmission selected in the reception station to the beam number at the previous transmission notified from the transmission station. The beam number generator 19 references a code book stored in the code book storage 20, and outputs the ID of the beam number corresponding to the difference value to the multiplexer 23. In addition, at the first transmission, the beam number generator references the code book in the code book storage 20, and outputs the ID corresponding to the beam number determined in the beam selector 18 to the multiplexer 23.

The code book storage 20 includes a first code book relevant to the beam number for first transmission and a second code book relevant to the beam numbers for second transmission and the later. The contents of the code books are described later in detail.

Based on the CRC check in the CRC checker 17, the ACK/NACK generator 21 outputs ACK (Acknowledgement) as a response signal if the decoding result is OK and reception ends in success; outputs NACK (Not Acknowledgement) as a response signal if the decoding result is NG and reception ends in failure. The encoder 22 performs coding processing of the transmission data and outputs the data to the multiplexer 23. The multiplexer 23 performs multiplex processing of the input beam number, the response signal of ACK/NACK, the transmission signal containing the coded transmission data, etc. The multiplexer 23 performs rate matching processing of adaptively setting the number of modulation multiple values and the coding rate, interleave processing, modulation processing, etc., and outputs the result to the transmission RF section 24.

The transmission RF section 24 performs processing of serial/parallel conversion, inverse Fourier transform, etc., and then converts the signal into a radio-frequency signal of a predetermined radio frequency band and performs power amplification and then transmits the signal as a radio wave from the antenna 11a. At this time, the signal containing the beam number and the response signal of ACK/NACK transmitted from the reception station is transmitted to the transmission station as a feedback signal. The multiplexer 23 and the transmission RF section 24 provide the function of a feedback information transmitter.

On the other hand, the transmission station shown in FIG. 2 includes a encoder 31, a control signal generator 32, a multiplexer 33, a code book information storage 34, a pre-coding processor 35, a plurality of transmission RF sections 36a and 36b, a plurality of antennas 37a and 37b, a reception RF section 38, a separator 39, a demodulator/decoder 40, and a CRC checker 41.

A radio wave transmitted from a remote station (for example, the reception station shown in FIG. 1) is received by the antenna 37a. The radio-frequency signal of the radio wave received at the antenna 37a is converted into a signal of a comparatively low frequency band such as a baseband signal in the reception RF section 38 and then the signal is input to the separator 39. The separator 39 separates a feedback signal from the reception signal and extracts and outputs the beam number, the response signal of ACK/NACK, etc., contained in the feedback signal. The beam number is input to the control signal generator 32 and the code book information storage 34 and the response signal is input to the encoder 31.

The demodulator/decoder 40 performs demodulation processing and decoding processing of the reception signal separated in the separator 39 to restore the received data. The CRC checker 41 executes CRC check about the data output from the demodulator/decoder 40 and determines whether or not a data error occurs and the CRC checker 17 outputs the data as reception data.

The encoder 31 performs coding processing of transmission data and outputs the data to the multiplexer 33. The control signal generator 32 generates and outputs a control signal containing a transmission parameter indicating the modulation system, the coding rate, etc., of the transmission signal, the beam number indicating the beam pattern of the transmission signal, and the like. In this case, the beam number is set in the remote station (reception station) to be transmitted and the beam number separated and extracted in the separator 39 is used.

The multiplexer 33 performs multiplex processing of the transmission signal containing the coded transmission data, the control signal containing the input beam number, etc. The multiplexer 33 performs rate matching processing of adaptively setting the number of modulation multiple values and the coding rate, interleave processing, modulation processing, etc., and outputs the result to the pre-coding processor 35.

The code book information storage 34 has the function of a notified beam information storage and stores therein code book information for each transmission. That is, the code book information storage stores first code book information relevant to the beam number for first transmission and second code book information relevant to the beam numbers for second transmission and the later corresponding to the code books in the code book storage 20. The code book information storage 34 recognizes that the beam number received this time output from the separator 39 is represented by the difference value, and combines the beam number represented by the difference and the beam number previously notified and used for transmission to restore the beam number desired by the remote station (reception station). The code book information storage 34 references the code book and outputs the ID corresponding to the restored beam number to the control signal generator 32 and the pre-coding processor 35. The separator 39 and the code book information storage 34 provide the function of a beam information acquirer.

The pre-coding processor 35 performs pre-coding processing for the output of the multiplexer 33 using the beam number received from the code book information storage 34. At this time, the pre-coding processor 35 separates and generates transmission signals output to the plurality of antennas, performs weighting processing to form a beam corresponding to the specified beam number, and outputs the transmission signals to the transmission RF sections 36a and 36b.

The transmission RF sections 36a and 36b perform processing of serial/parallel conversion, inverse Fourier transform, etc., of the transmission signal and then convert the signal into a radio-frequency signal of a predetermined radio frequency band and perform power amplification and then transmits the signal as a radio wave from the antennas 37a and 37b. The transmission RF sections 36a and 36b provide the function of a transmitter. The transmission signal from the transmission station is transmitted to the reception station as a pilot signal, a control signal, a data signal containing various pieces of data, and the like. The pilot signal and the control signal are transmitted as nondirectional signals forming no beam in a pilot channel, and the data signal is transmitted as a directional signal forming a predetermined beam responsive to the beam number by pre-coding a predetermined transmission channel.

The following description assumes the case where an error correction code of CRC, etc., is not contained in an upload communication signal fed back into a radio base station from a user terminal when communications are conducted between the radio base station of a transmission station and the user terminal of a reception station in a radio communication system of a cellular system adopting MIMO. That is, the characteristics of the upload and download communication lines are asymmetric with respect to the control signal and the feedback signal transmitted and received between the radio base station and the user terminal. Further, there is a possibility that sufficient reliability of a propagation path cannot be ensured because of fading, etc., about the upload communication line. In the upload communication line for transmitting the feedback signal, to reduce the power consumption of the user terminal, it is considered that redundancy of communication data is decreased and a signal mode of adding no error correction code is used. It is assumed that sufficient reliability of a propagation path is ensured about the download communication line.

In this case, if a feedback signal determination error occurs because of fading variation, etc., in the radio base station, the beam number is erroneously determined and beam selection becomes erroneous. Then, in the embodiment, making the most of information of the control signal for pre-coding transmitted in the download communication line where sufficient reliability is ensured with error correction code CRC added, the difference indicating the relative value to the previous beam number notified from the radio base station is transmitted in the feedback signal and a determination error of the feedback signal in the radio base station is circumvented for improving the reliability when pre-coding is performed.

Figure 3:
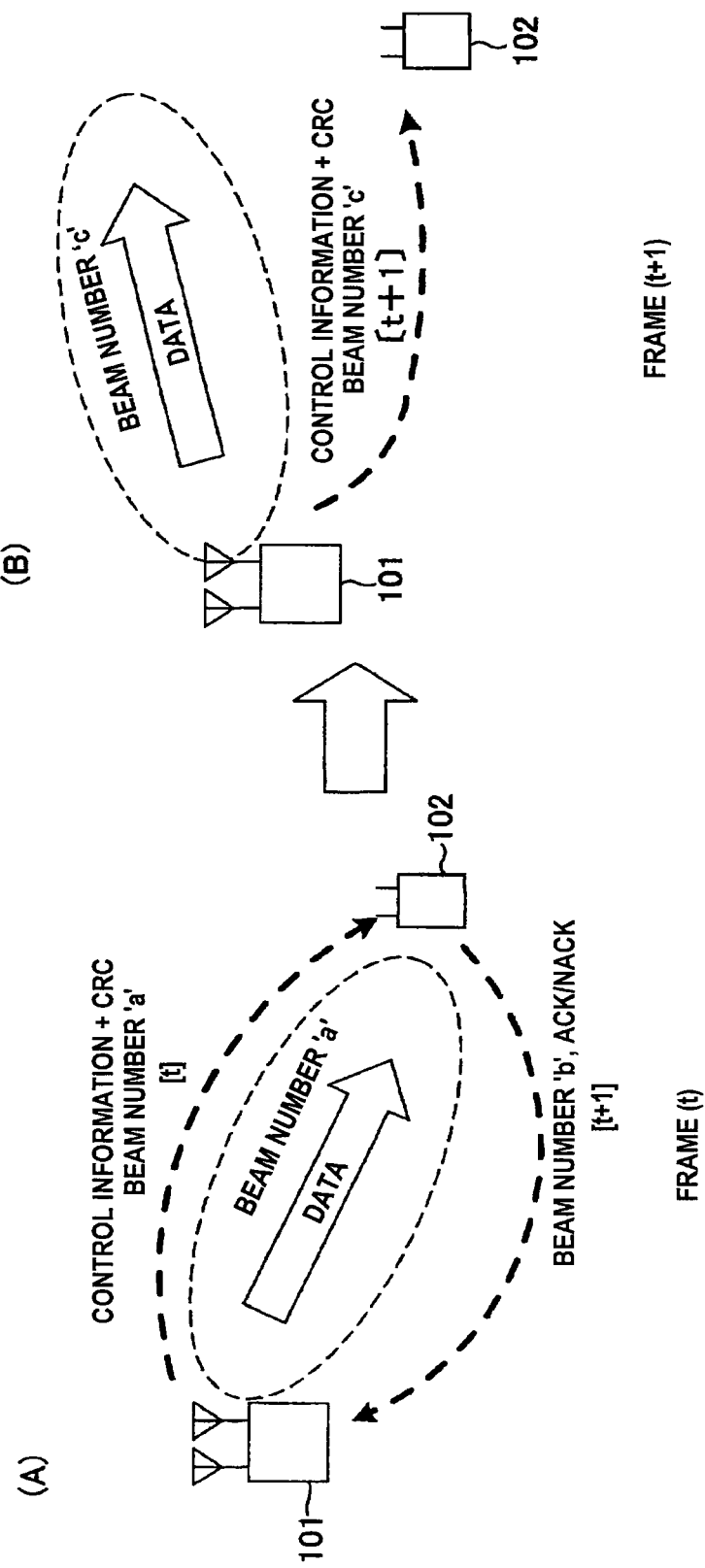
FIG. 3 shows an example of a beam forming operation by pre-coding when a feedback signal determination error occurs.

FIG. 3 shows an example of the beam forming operation by pre-coding when a feedback signal determination error occurs. In FIG. 3, (A) shows a state of arbitrary frame (t) time and (B) shows a state of a frame (t+1) time just after (A).

In the frame (t) in (A) of FIG. 3, it is assumed that a data signal is transmitted to a user terminal 102 according to a beam of an appropriate beam number 'a' from a radio base station 101. At this time, a pilot signal and a control signal are transmitted concurrently from the radio base station 101 to the user terminal 102, and a control signal for pre-coding containing the beam number 'a' as control information is transmitted in a state in which error correction code CRC is added. Thus, the user terminal 102 can correctly recognize the beam number notified from the radio base station 101.

The user terminal 102 selects an optimum beam in the next frame (t+1) based on the channel estimation value of the received pilot signal. Here, it is assumed that a beam number 'b' near to the frame (t) is selected. The user terminal 102 demodulates and decodes the received data signal and determines whether or not the demodulated reception data is correct. The user terminal 102 transmits the beam number 'b' and a response signal of ACK/NACK indicating whether or not the reception data is correct to the radio base station 101 as a feedback signal.

In this case, it is assumed that a determination error of the feedback signal occurs in the radio base station 101 and the beam number 'b' is erroneously recognized as a beam number 'c'. In this case, in the frame (t+1) in (B) of FIG. 3, a data signal is transmitted to the user terminal 102 according to a beam of the erroneous beam number 'c' from the radio base station 101. A control signal for pre-coding containing the beam number 'c' is transmitted along with a pilot signal from the radio base station 101 to the user terminal 102. In such a case, in the user terminal 102, sufficient electric field intensity cannot be ensured as the communication quality and the probability that demodulation of the reception signal will end in failure increases and thus a decrease in throughput results.

FIG. 4 shows an example of the beam forming operation by pre-coding in the radio communication system of the first embodiment. In FIG. 4, (A) shows a state of any frame (t) time and (B) shows a state of a frame (t+1) time just after (A). In the radio communication system, a radio base station 51 corresponds to the transmission station in FIG. 2 and a user terminal 52 corresponds to the reception station in FIG. 1.

In the frame (t) in (A) of FIG. 4, it is assumed that a beam of an appropriate beam number 'a' is formed in a transmission signal by performing pre-coding processing in the pre-coding processor 35 of the radio base station 51 and a data signal is transmitted to the user terminal 52 according to the beam of the beam number 'a' from the radio base station 51. At this time, a pilot signal and a control signal are transmitted concurrently from the radio base station 51 to the user terminal 52, and a control signal for pre-coding containing the beam number 'a' as control information is transmitted in a state in which error correction code CRC is added. Thus, the control signal demodulator 14 of the user terminal 52 can correctly demodulate and recognize the beam number notified from the radio base station 51.

The user terminal 52 selects an optimum beam in the next frame (t+1) in the beam selector 18 based on the channel estimation value of the pilot signal output from the channel estimator 13. Here, it is assumed that a beam number 'b' near to the frame (t) is selected. Here, it is assumed that the user terminal 52 calculates a difference value D between the beam number 'a' at the current transmission notified by the radio base station 51, output from the control signal demodulator 14 and the beam number 'b' desired at the next transmission output from the beam selector 18 (=b−a) in the beam number generator 19 and the difference value D represents the beam number. The user terminal 52 references the code book in the code book storage 20 and outputs the ID corresponding to the beam number represented by the difference value D. The user terminal 52 also demodulates and decodes the received data signal in the MIMO demodulator 15 and the decoder 16 and determines whether or not the demodulated reception data is correct in the CRC checker 17. The user terminal 52 transmits the beam number D based on the difference and a response signal of ACK/NACK indicating whether or not the reception data is correct to the radio base station 51 as a feedback signal.

In the frame (t+1) in (B) of FIG. 4, the radio base station 51 receives the feedback signal transmitted from the user terminal 52 and determines the beam number desired by the user terminal 52. In this case, the code book information storage 34 previously stores the beam number 'a' used at the previous transmission and notified to the user terminal 52 and combines the beam number based on the difference value D received from the user terminal 52 and the previously notified beam number 'a' to restore the beam number 'b' desired by the user terminal 52. The code book information is referenced and the ID corresponding to the restored beam number 'b' is output. Next, the pre-coding processor 35 performs pre-coding processing adapted to the beam number 'b', whereby a beam of the appropriate beam number 'b' is formed in the transmission signal and a data signal is transmitted to the user terminal 52 according to the beam of the beam number 'b'. A control signal for pre-coding containing the beam number 'b' is transmitted along with a pilot signal from the radio base station 51 to the user terminal 52.

FIGS. 5A and 5B show specific examples of code books stored in the code book storage 20 of the reception station. FIG. 5A shows an example of a first code book relevant to the beam number for first transmission and FIG. 5B shows an example of a second code book relevant to the beam numbers for second transmission and the later. In the embodiment, the beam number and the ID information of the beam corresponding to the beam number are used as beam information.

The first code book for first transmission shown in FIG. 5A stores n beam numbers of 'a', 'b', ... 'n−1', and 'n' as the beam numbers corresponding to stipulated beam patterns and n IDs of 0000, 0001, ..., 1110, and 1111 corresponding to the beam numbers in association with each other. Here, an example wherein 16 beam numbers are used as n=16 is shown. At the first transmission, the first code book is referenced and the ID corresponding to the beam number selected based on the channel estimation value is output.

The second code book for second transmission and the later shown in FIG. 5B stores the beam numbers indicating the difference value of the relative value between the current selected beam number and the previously notified beam number such as keep (indicating difference ±0), +1, ... and the IDs of 0000, 0001, 0010, 0011, ... corresponding to the beam numbers in association with each other. In the frames near on the time axis, change in the optimum beam number is a small change or almost no changes for each transmission, and thus the frequency of a small number of 0, ±1, etc., as the difference value between the beam numbers is high. In the embodiment, the beam number indicating the difference value is assigned every other ID. At the second or later transmission, the second code book is referenced and the ID corresponding to the difference value between the beam number used for the previous transmission and notified from the transmission station and the beam number selected based on the current channel estimation value is output.

Thus, in the embodiment, when the desired beam number is fed back into the transmission station from the reception station, the difference is transmitted, whereby the code-to-code distance of the information representing the beam number can be ensured. Accordingly, the error correction capability can be enhanced and a determination error can be circumvented without adding an error correction code to the feedback signal. In the second code book for second transmission and the later corresponding to the difference values, as in FIG. 5B, when the ID is represented by a binary number, the tail one bit can be omitted and if resources equal to those at the first transmitting time can be ensured, the energy per bit can be enhanced.

FIGS. 6A and 6B show examples of different forms of code books stored in the code book storage 20 of the reception station. FIG. 6A shows an example of a first code book relevant to the beam number for first transmission and FIG. 6B shows an example of a second code book relevant to the beam number for second transmission.

The first code book for first transmission shown in FIG. 6A is similar to that in FIG. 5A and stores n beam numbers of beam numbers 'a', . . . , 'd', 'n−1', and 'n' and n IDs of 0000, . . . , 1100, . . . , 1110, and 1111 corresponding to the beam numbers in association with each other.

In the second code book for second transmission shown in FIG. 6B, the ID corresponding to the beam number is changed and the ID in the first code book for first transmission in FIG. 6A is shifted two bits to the left as indicated by the underscore in the figure. At the later transmitting time, the further bit-shifted ID from the second code book may be used. That is, the ID resulting from bit-shifting the ID of the beam notified at the previous transmitting time represents the beam number. In this case, in the ID, the relative value of the beam number selected at the current transmission to the beam number notified at the previous transmission can be represented. The beam numbers are similar to those in the first code book for first transmission. As the code book is thus configured, for example, if an error easily occurs in the resources corresponding to a specific bit position, the effect of successive occurrence of a bit number error can be decreased. The ID shift amount may be a different value such as two bits→three bits→one bit, etc., for each transmission, and an event of receiving the beam number in a control signal, etc., may be adopted as a trigger for changing the shift amount.

Figure 7:
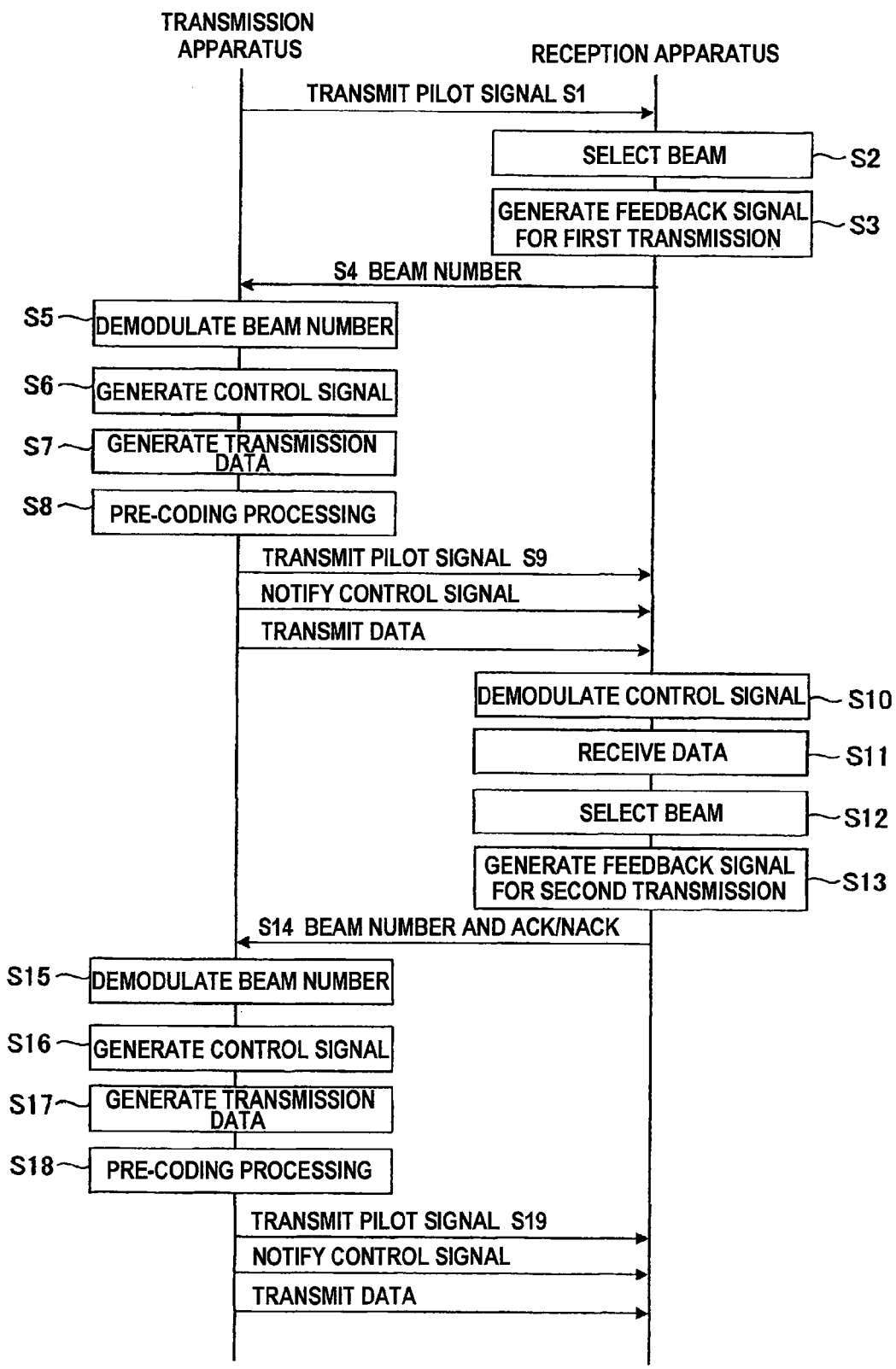
FIG. 7 is a sequence chart to show a specific example of a control procedure concerning communications between the transmission station and the reception station in the first embodiment.

Next, in the embodiment, a control procedure containing a specific example when communications are conducted between the reception station shown in FIG. 1 and the transmission station shown in FIG. 2 will be discussed below with reference to FIG. 7:

FIG. 7 is a sequence chart to show a specific example of a control procedure concerning communications between the transmission station and the reception station in the first embodiment. Here, a specific example corresponding to the operation example in FIG. 4 is also shown.

At step S1, the transmission station (transmission apparatus) transmits a pilot signal to the reception station (reception apparatus) in a pilot channel. At step S2, the reception station (reception apparatus) receives the pilot signal, measures and checks the reception state of the pilot channel, and selects any desired beam (in the example in FIG. 4, beam number 'a', ditto for the following) by the beam selector 18 from the reception quality when each predefined beam is assumed. At step S3, the beam number generator 19 references the first code book for first transmission in the code book storage 20 based on the beam number of the beam selected at step S2 (beam number 'a'), and generates a feedback signal for first transmission containing information specifying the beam number. At this time, the beam number generator 19 stores the beam number (beam number 'a') to be fed back. Subsequently, at step S4, the feedback signal containing the beam number is transmitted to the transmission station.

At step S5, the transmission station references the code book information for first transmission by the code book information storage 34 and demodulates the beam number (beam number 'a'). At this time, the code book information storage 34 stores the received beam number (beam number 'a'). At step S6, the control signal generator 32 generates a control signal containing transmission parameters (modulation system and coding rate) and the beam number (beam number 'a') to be transmitted to the reception station from which the feedback signal has been received.

Subsequently, at step S7, the encoder 31 encodes transmission data and the multiplexer 33 performs multiplexing processing with the control signal, etc., to generate a data signal containing the transmission data. Then, at step S8, the pre-coding processor 35 performs pre-coding processing corresponding to the beam number (beam number 'a') desired by the reception station for the transmission signal. At step S9, the pilot signal, the control signal, and the data signal are transmitted from the transmission station to the reception station.

At step S10, the reception station demodulates the control signal and extracts the transmission parameters and the beam number (beam number 'a') by the control signal demodulator 14. Subsequently, at step S11, the channel estimator 13 finds the channel estimation value corresponding to the received beam and the MIMO demodulator 15 and the decoder 16 demodulate and decode the reception data, whereby reception processing is performed. At step S12, the beam selector 18 selects any desired beam (beam number 'b') as at step S2 based on the reception state of the immediately preceding pilot signal.

Next, at step S13, the beam number generator 19 calculates the difference value (beam number 'b−a') indicating the relative value between the beam number (beam number 'a') notified from the transmission station at the preceding time and received at step S10 and the current selected beam number (beam number 'b'). The second code book for second transmission and the later in the code book storage 20 is referenced and a feedback signal for second transmission containing information of the beam number represented by the difference value is generated. Next, at step S14, a feedback signal containing a response signal of ACK/NACK corresponding to the demodulation result at step S11 and the beam number (beam number 'b−a') represented by the difference value generated at step S13 is transmitted to the transmission station.

At step S15, the transmission station references the code book information for second transmission and the later and demodulates the beam number (beam number 'b') by the code book information storage 34. At this time, the code book information storage 34 recognizes that the received beam number is represented by the difference value, and combines the beam number represented by the difference (beam number 'b−a') and the beam number (beam number 'a') previously used for transmission and notified to restore the beam number desired by the reception station (beam number 'b'). The separator 39 demodulates the response signal of ACK/NACK. At step S16, the control signal generator 32 generates a control signal containing transmission parameters (modulation system and coding rate) to be transmitted to the reception station from which the feedback signal has been received and the beam number (beam number 'b') demodulated at step S15. Subsequently, at step S17, the encoder 31 encodes transmission data and the multiplexer 33 performs multiplexing processing with the control signal, etc., to generate a data signal containing the transmission data. Then, at step S18, the pre-coding processor 35 performs pre-coding processing corresponding to the beam number (beam number 'b') demodulated this time for the transmission signal. At step S19, the pilot signal, the control signal, and the data signal are transmitted from the transmission station to the reception station.

As described above, in the first embodiment, in radio communications using pre-coding, information of the beam number contained in the control signal having ensured reliability notified from the transmission station to the reception station is utilized and when the desired beam number is fed back into the transmission station from the reception station at the later transmitting time, the difference indicating the relative value to the previously notified beam number is transmitted. In this case, the code-to-code distance of the information representing the beam number can be ensured, so that the error correction capability can be enhanced without adding an error correction code to the feedback signal. Therefore, when the beam number fed back from the reception station is determined in the transmission station, a determination error can be circumvented, the reliability of beam selection at the pre-coding processing time can be improved, and it is made possible to enhance throughput.

Second Embodiment

Figure 8:
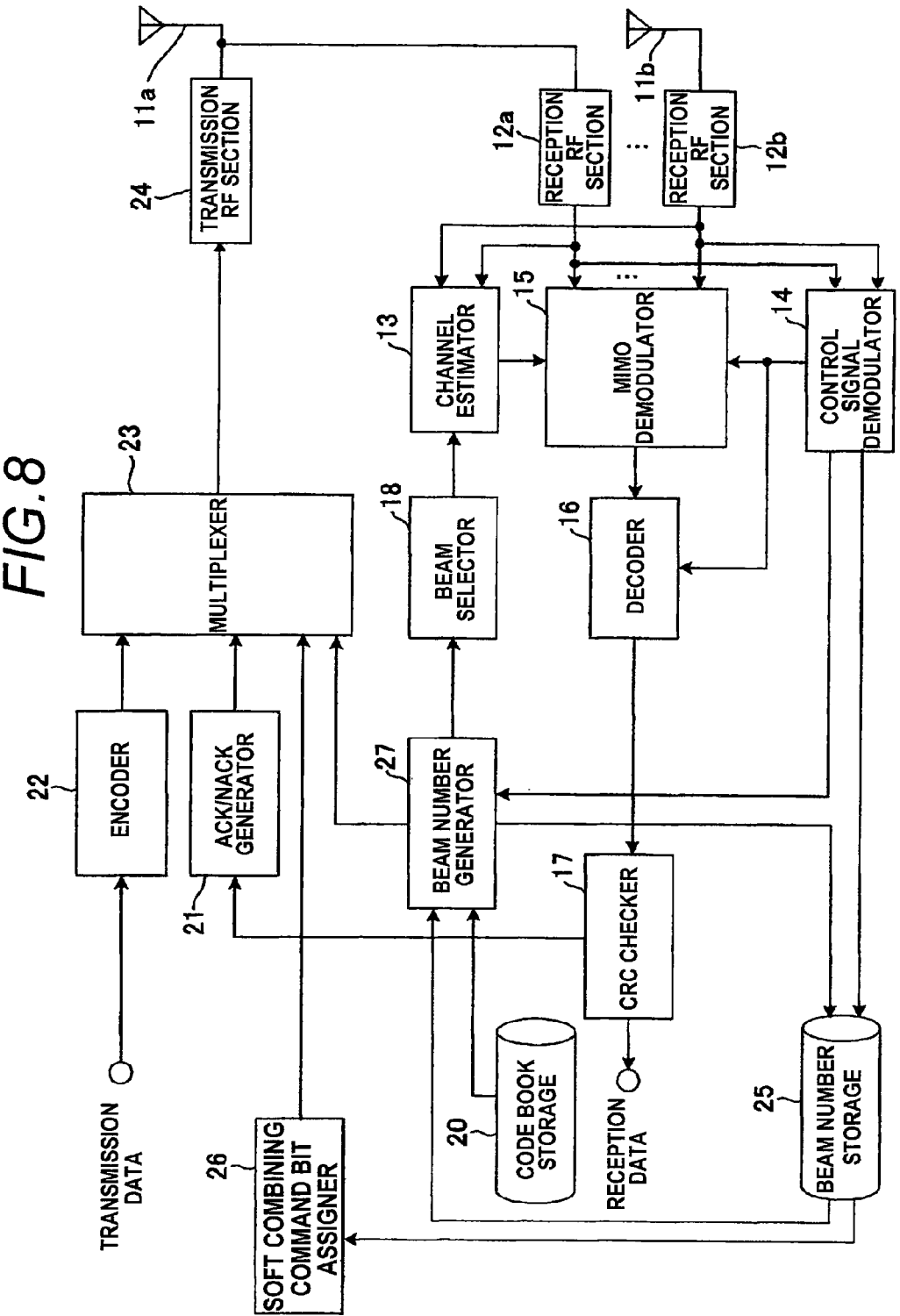
FIG. 8 is a block diagram to show the configuration of the main part of a reception station (reception apparatus) used in a second embodiment of the invention.
Figure 9:
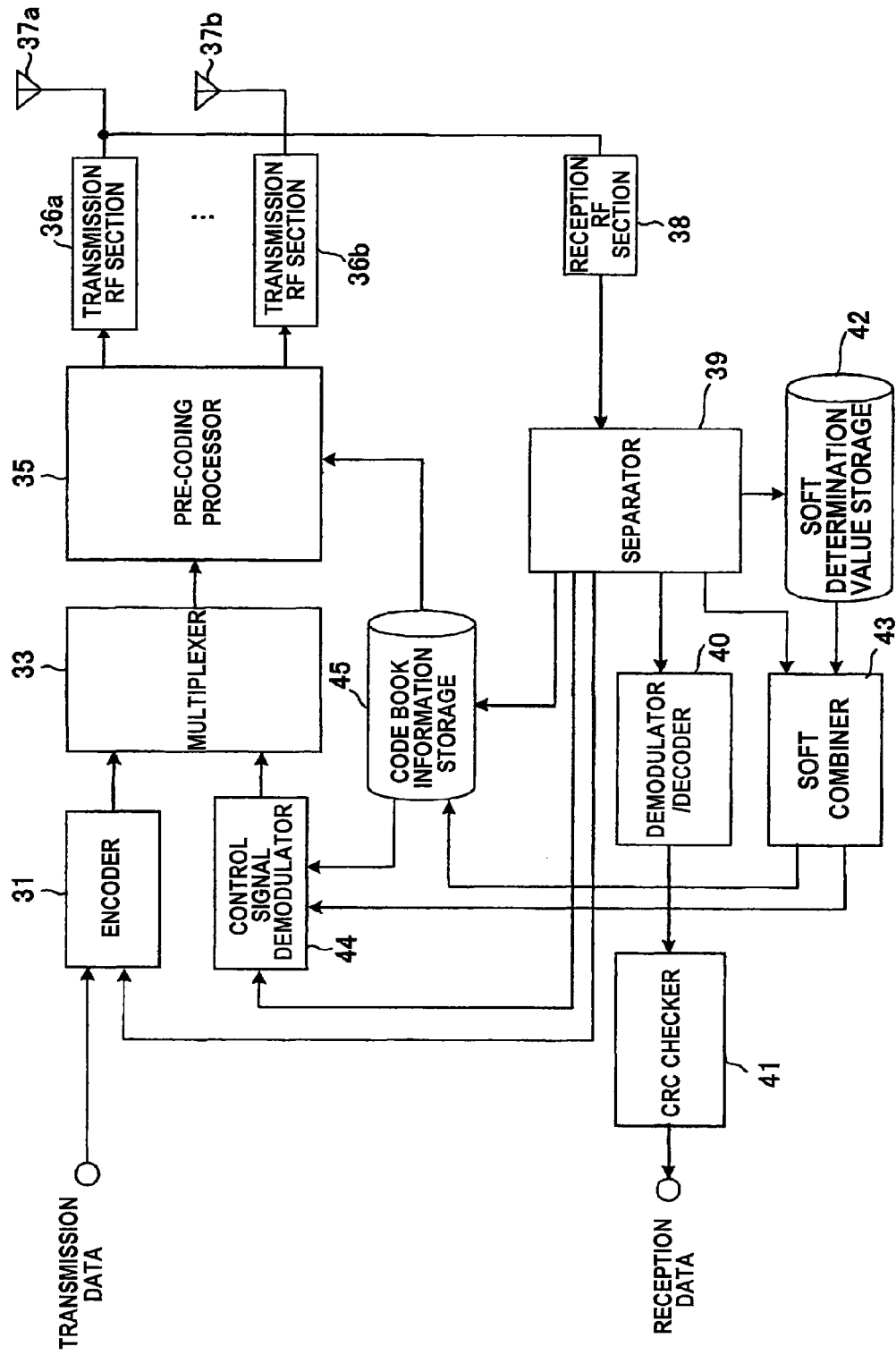
FIG. 9 is a block diagram to show the configuration of the main part of a transmission station (transmission apparatus) used in the second embodiment of the invention.

FIG. 8 is a block diagram to show the configuration of the main part of a reception station (reception apparatus) used in a second embodiment of the invention, and FIG. 9 is a block diagram to show the configuration of the main part of a transmission station (transmission apparatus) used in the second embodiment of the invention.

The second embodiment is an example provided by changing a part of the first embodiment. Components similar to those of the first embodiment are denoted by the same reference numerals in the second embodiment and will not be discussed again in detail.

The reception station shown in FIG. 8 is provided by adding new components of a beam number storage 25 and a soft combining command bit assigner 26 to the configuration in FIG. 1. Moreover, the reception station differs from the reception station shown in FIG. 1 partially in the operation of a beam number generator 27. The beam number storage 25 receives the beam number generated and output by the beam number generator 27 and stores the beam number until the next feedback signal generating time. The beam number storage 25 receives the beam number received from a control signal demodulator 14 in the data reception operation and makes a comparison between the beam number used at the previous feedback signal generating time and the received beam number. If they differ, the beam number storage notifies the soft combining command bit assigner 26 and the beam number generator 27 that a feedback signal determination error has occurred in the remote station (transmission station).

Upon reception of the notification that a determination error has occurred in the remote station (transmission station) from the beam number generator 27, the soft combining command bit assigner 26 generates a soft combining command bit for commanding the remote station to perform soft combining of the beam number, and outputs the bit to a multiplexer 23.

Upon reception of the notification that a determination error has occurred in the remote station (transmission station) from the beam number generator 27, the beam number generator 27 again generates the same beam number as the beam number transmitted in the feedback signal at the previous time and outputs the beam number to the multiplexer 23. The multiplexer 23 performs multiplex processing of the input beam number, a response signal of ACK/NACK, the soft combining command bit, a transmission signal containing coded transmission data, etc., and performs modulation processing, etc., and outputs the result to a transmission RF section 24. The transmission RF section 24 converts the signal into a radio-frequency signal of a predetermined radio frequency band and transmits the signal as a radio wave from an antenna 11a. At this time, the signal containing the beam number, the response signal of ACK/NACK, and the soft combining command bit transmitted from the reception station is transmitted to the transmission station as a feedback signal.

On the other hand, the transmission station shown in FIG. 9 is provided by adding new components of a soft determination value storage 42 and a soft combiner 43 to the configuration in FIG. 2. The transmission station in FIG. 9 differs from the transmission station shown in FIG. 2 partially in the operation of a control signal generator 44 and a code book information storage 45. The soft determination value storage 42 receives a soft determination value of a feedback signal from a separator 39 and stores the soft determination value until the next feedback signal receiving time. The separator 39 separates the feedback signal from the reception signal, extracts and outputs the beam number, the response signal of ACK/NACK, the soft combining command bit, etc., contained in the feedback signal, and also outputs the soft determination value of the feedback signal.

In the feedback signal reception operation, the soft combiner 43 receives the feedback signal from the separator 39 and receives a soft determination value at the previous feedback signal receiving time from the soft determination value storage 42. If the feedback signal received from the separator 39 contains the soft combining command bit, the reception signal at the time and the soft determination value are soft-combined and then demodulated and the beam number of the demodulation result is output to the control signal generator 44 and the code book information storage 45.

The control signal generator 44 and the code book information storage 45 overwrite the beam number output from the separator 39 with the beam number output by the soft combiner 43 and performs the later processing using the beam number. The code book information storage 45 outputs the ID corresponding to the beam number received from the soft combiner 43 to the control signal generator 44 and a pre-coding processor 35. The pre-coding processor 35 performs pre-coding processing for output of a multiplexer 33 and weights a transmission signal so that a predetermined beam responsive to the beam number based on the soft combining result is formed.

In the second embodiment, only soft combining of the beam number is described, but feedback and restoration of the relative value of the beam number using information of the down control signal in the first embodiment can also be applied in combination.

Figure 10:
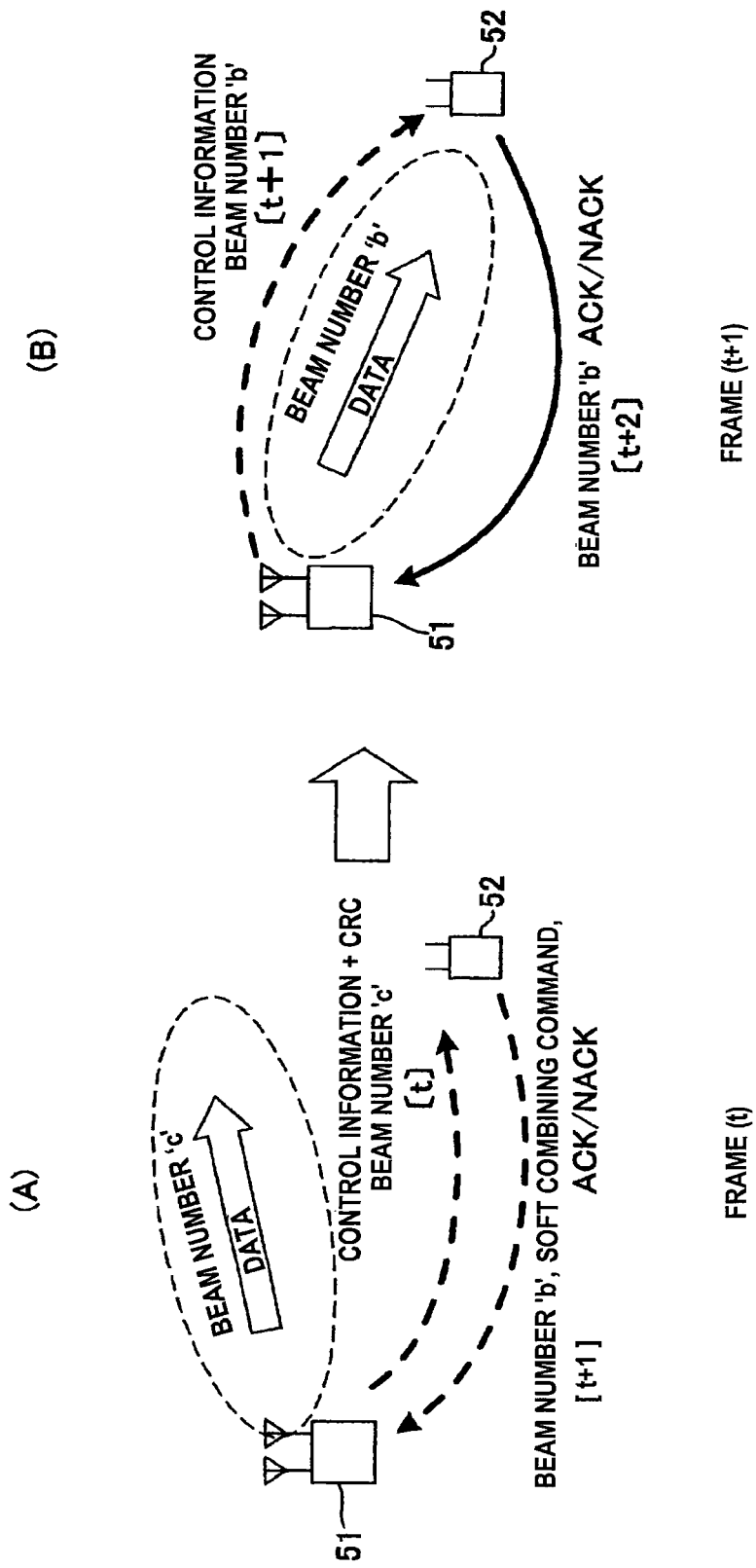
FIG. 10 shows an example of the beam forming operation by pre-coding in a radio communication system of the second embodiment.
Figure 11:
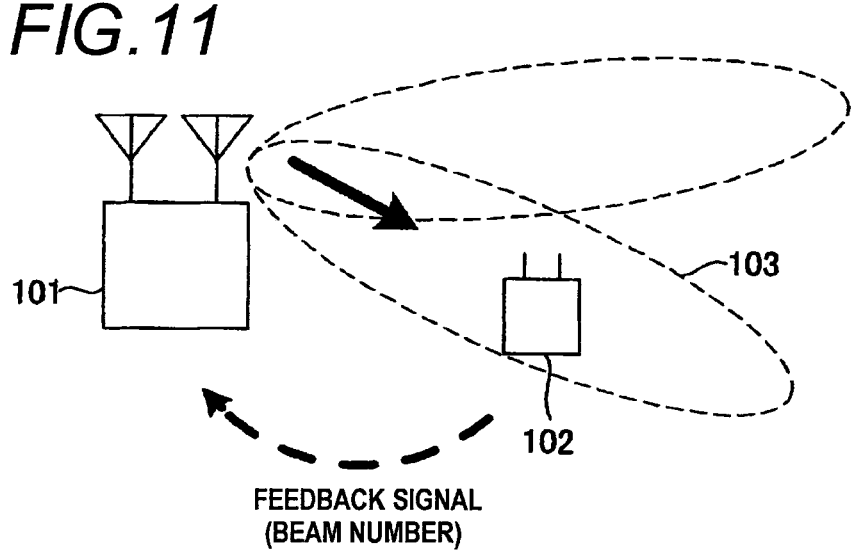
FIG. 11 schematically shows transmission beam formation by pre-coding.

FIG. 10 shows an example of the beam forming operation by pre-coding in a radio communication system of the second embodiment. In FIG. 10, (A) shows a state of any frame (t) time and (B) shows a state of a frame (t+1) time just after (A). In the radio communication system, a radio base station 51 corresponds to the transmission station in FIG. 9 and a user terminal 52 corresponds to the reception station in FIG. 8.

In the frame (t) in (A) of FIG. 10, the case where a determination error of a feedback signal in the separator 39 of the radio base station 51 occurs and it is erroneously determined that the beam number 'b' previously fed back from the user terminal 52 is beam number 'c' is assumed. In this case, the pre-coding processor 35 performs pre-coding processing, whereby a beam of the beam number 'c' different from the command of the user terminal 52 in the transmission signal is formed and a data signal is transmitted according to the beam of the beam number 'c' in an erroneous direction from the radio base station 51 to the user terminal 52. From the radio base station 51 to the user terminal 52, a pilot signal and a control signal are transmitted and a control signal for precoding containing the beam number 'c' as control information is transmitted in a state in which an error correction code CRC is added.

In the user terminal 52, the beam number storage 25 determines whether or not the beam number is correct and recognizes that the beam number 'c' at the current transmission notified by the radio base station 51 and output from the control signal demodulator 14 differs from the beam number 'b' previously selected in a beam selector 18 and contained at the feedback signal generating time. If it is thus detected that the beam number differs from the beam number specified from the own station, a soft combining command bit as a command for performing soft combining with the previous soft determination value, the same beam number 'b' as the previous beam number, and a response signal of ACK/NACK are transmitted to the radio base station 51 as a feedback signal in the next frame (t+1.

In the frame (t+1) in (B) of FIG. 10, the radio base station 51 receives the feedback signal transmitted from the user terminal 52 and determines the beam number desired by the user terminal 52. At this time, the soft determination value storage 42 previously stores the soft determination value of the previous beam number and the soft combiner 43 determines whether or not the soft combining command bit exists and if the feedback signal contains the soft combining command bit, the beam number received this time and the previous soft determination value are software-combined and then demodulated. As the soft combining is performed, the correct beam number 'b' can be demodulated.

In the code book information storage 45, the code book information is referenced and the ID corresponding to the demodulated beam number 'b' is output. Next, the pre-coding processor 35 performs pre-coding processing adapted to the beam number 'b', whereby a beam of the appropriate beam number 'b' is formed in the transmission signal and a data signal is transmitted according to the beam of the beam number 'b' to the user terminal 52. A control signal for pre-coding containing the beam number 'b' is transmitted together with a pilot signal from the radio base station 51 to the user terminal 52.

Since the beam number notified from the radio base station 51 and the previous specified beam number match, the user terminal 52 transmits the beam number selected this time and a response signal of ACK/NACK to the radio base station 51 as a feedback signal.

As described above, in the second embodiment, in radio communications using pre-coding, information of the beam number contained in the feedback signal fed back into the transmission station from the reception station is utilized and if a determination error of the feedback signal occurs, soft combining is performed using the soft determination value of the previous feedback signal. Accordingly, the energy of the previous reception signal is utilized and a determination error of the feedback signal can be circumvented, so that the reliability of beam selection at the pre-coding processing time can be improved and it is made possible to enhance throughput.

In the embodiments described above, the case where each of the transmission station and the reception station includes two antennas is assumed, but the embodiments can also be applied in a similar manner if the number of antennas is increased to three, four, etc., as required.

As described above, the radio communication apparatus according to the invention can be installed in a mobile station apparatus (communication terminal) and a base station apparatus in a mobile communication system and accordingly a radio communication mobile station apparatus, a radio communication base station apparatus, and a mobile communication system having the advantages similar to those described above can be provided.

It is to be understood that the invention is not limited to the items shown in the embodiments and the invention is also intended for those skilled in the art to make modifications and application based on the description of the invention and well-known arts and the modifications and the application are contained in the scope to seek protection.

In the description of each of the embodiments, the case where the invention is implemented as hardware is taken as an example, but the invention can also be implemented as software.

The function blocks used in the description of the embodiments are implemented typically as an LSI of an integrated circuit. They may be individually put into one chip or some or all of the function blocks may be put into one chip. Here, the integrated circuit is an LSI, but may be called IC, system LSI, super LSI, or ultra LSI depending on the integration difference.

The technique of putting the function blocks into an integrated circuit is not limited to LSI and they may be implemented as a dedicated circuit or a general-purpose processor. An FPGA (Field Programmable Gate Array) that can be programmed after LSI is manufactured or a reconfigurable processor wherein connection and setting of circuit cells in LSI can be reconfigured may be used.

Further, if a technology of the function blocks into an integrated circuit replacing LSI shows up with the advance in the semiconductor technology or according to another derived technology, the function blocks may be integrated using the technology, of course. There is a possibility of applying biotechnology, etc.

While the invention has been described in detail with reference to the specific embodiments, it will be obvious to those skilled in the art that various changes and modifications can be made without departing from the spirit and the scope of the invention.

This application is based on Japanese Patent Application (No. 2007-094569) filed on Mar. 30, 2007, the contents of which is incorporated herein by reference.

INDUSTRIAL APPLICABILITY

The invention has the advantage of making it possible to improve the reliability of beam selection by pre-coding and is useful as a radio communication system, a radio communication apparatus, a radio communication method, etc., that can be applied to MIMO (Multiple-Input Multiple-Output), etc., for conducting communications using a plurality of antennas.

The invention claimed is:

1. A radio communication system for conducting communications using a plurality of antennas, the radio communication system comprising:
   a first radio communication apparatus used as a radio reception station including:
      a beam selector for receiving a signal from a radio transmission station and selecting a beam to be utilized, via pre-coding, in a future transmission in response to a state of a propagation path of the reception signal;
      a beam information generator for generating beam information to indicate the selected beam based on a relative value between a beam number of a beam utilized, by the radio transmission station, for the reception signal, as indicated by the radio transmission station, and a beam number of the beam selected for the future transmission, wherein the beam information corresponds to an index of a codebook storing relative beam number values; and a feedback information transmitter for transmitting feedback information containing the beam information generated to indicate the selected beam to the radio transmission station, and a second radio communication apparatus used as the radio transmission station including:

a beam information acquirer for receiving the feedback information from the radio reception station and determining the beam selected by the radio reception station from the beam information generated from the relative value;

a pre-coding processor for performing pre-coding to form a predetermined beam by weighting the signal to be output to a plurality of antennas based on the determined beam selected by the radio reception station;

a control information generator for generating control information containing beam information specifying the predetermined beam formed by the pre-coding; and a transmitter for transmitting the control information and the signal subjected to the pre-coding processing to the radio reception station.

2. The radio communication system according to claim 1, wherein the characteristic of a communication line between the first radio communication apparatus and the second radio communication apparatus is asymmetric, and sufficient reliability of the propagation path of the communication line from the second radio communication apparatus used as the radio transmission station to the first radio communication apparatus used as the radio reception station is ensured.

3. A radio communication apparatus used in a radio communication system for conducting communications using a plurality of antennas, the radio communication apparatus comprising:

a beam selector for receiving a signal from a radio transmission station and selecting a beam, corresponding to a predetermined beam formed by weighting a signal to be output to a plurality of antennas, to be utilized by the radio transmission station, via pre-coding, in a future transmission, the beam selector selects the beam based on a state of a propagation path of the reception signal;

a beam information generator for generating beam information to indicate the selected beam based on a relative value between a beam number of a beam utilized by the radio transmission station for the reception signal and a beam number of the beam selected for the future transmission, wherein the beam information corresponds to an index of a codebook storing relative beam number values; and a feedback information transmitter for transmitting feedback information containing the beam information generated to indicate the selected beam to the radio transmission station.

4. The radio communication apparatus according to claim 3, comprising a control information demodulator for demodulating control information transmitted from the radio transmission station and acquiring the beam information specifying the beam number of the beam utilized by the radio transmission station from the control information, wherein the beam information generator includes a codebook storing absolute beam numbers of beams and corresponding ID information and generates, by referencing the codebook storing absolute beam numbers and the codebook storing relative beam number values, the beam information that indicates the selected beam based on the relative value between the beam number of the beam utilized by the radio transmission station and the beam number of the beam selected for the future transmission.

5. The radio communication apparatus according to claim 4, wherein the codebook storing absolute beam numbers is utilized for a first transmission and the codebook storing relative beam number values is utilized for subsequent transmissions.

6. The radio communication apparatus according to claim 3, wherein the beam information generator calculates a difference between the beam number of the beam utilized by the radio transmission station and the beam number of the beam selected for the future transmission, and generates beam information based on an index of the codebook storing relative beam number values corresponding to a value of the difference.

7. The radio communication apparatus according to claim 3, wherein the beam information generator generates the beam information that indicates the beam selected for the future transmission according to information provided by bit-shifting beam information corresponding to the beam number of the beam utilized by the radio transmission station.

8. A radio communication apparatus used in a radio communication system for conducting communications using a plurality of antennas, the radio communication apparatus comprising:

a beam information acquirer for receiving feedback information from a radio reception station to which a signal is to be transmitted and determining a beam selected by the radio reception station from beam information, contained in the feedback information, corresponding to a relative value with respect to a beam number of a beam notified to the radio reception station and utilized to transmit a previous signal to the radio reception station, wherein the beam information corresponds to an index of a codebook storing relative beam number values;

a pre-coding processor for performing pre-coding to form a predetermined beam by weighting signals to be output to a plurality of antennas based on the beam selected by the radio reception station;

a control information generator for generating control information containing beam information specifying the predetermined beam formed by the pre-coding; and a transmitter for transmitting the control information and the signal subjected to the pre-coding processing to the radio reception station.

9. The radio communication apparatus according to claim 8, wherein the beam information acquirer includes a notified beam information storage for storing therein beam information specifying the beam notified to the radio reception station, and acquires beam information specifying the beam selected by the radio reception station from the stored beam information and the beam information representing the relative value, and outputs the beam information to the pre-coding processor.

10. A radio communication mobile station apparatus comprising the radio communication apparatus as claimed in claim 3.

11. A radio communication base station apparatus comprising the radio communication apparatus as claimed in claim 3.

12. A radio communication method in a radio communication system for conducting communications using a plurality of antennas, the radio communication method comprising:

a beam selecting step of receiving a signal from a radio transmission station and selecting, in response to a state of a propagation path of the reception signal, a beam to be utilized, via pre-coding, in a future transmission by the radio transmission station;

a beam information generating step of generating beam information to indicate the selected beam based on a relative value between a beam number of a beam utilized by the radio transmission station for the reception signal and a beam number of the beam selected for the future transmission, wherein the beam information corresponds to an index of a codebook storing relative beam number values;

a feedback information transmitting step of transmitting feedback information containing the beam information generated to indicate the selected beam to the radio transmission station;

a beam information acquiring step of receiving the feedback information from the radio reception station and determining the beam selected by the radio reception station from the beam information generated from the relative value;

a pre-coding processing step of performing pre-coding to form a predetermined beam by weighting signals to be output to a plurality of antennas based on the beam determined as selected by the radio reception station;

a control information generating step of generating control information containing beam information specifying the predetermined beam formed by the pre-coding; and a transmitting step of transmitting the control information and the signal subjected to the pre-coding processing to the radio reception station.

13. The radio communication system according to claim 1, wherein the beam numbers indicate optimum beam patterns.

14. The radio communication apparatus according to claim 3, wherein the beam numbers indicate optimum beam patterns.

15. The radio communication apparatus according to claim 8, wherein the beam numbers indicate optimum beam patterns.

16. The radio communication method according to claim 12, wherein the beam numbers indicate optimum beam patterns.

17. The radio communication system according to claim 1, wherein the relative value is the difference between the beam number of the beam utilized, by the radio transmission station, for the reception signal, as indicated by the radio transmission station, and the beam number of the beam selected for the future transmission.

18. The radio communication apparatus according to claim 3, wherein the relative value is the difference between the beam number of the beam utilized by the radio transmission station for the reception signal and the beam number of the beam selected for the future transmission.

19. The radio communication apparatus according to claim 8, wherein the relative value is the difference between the beam number of the beam notified to the radio reception station and utilized to transmit a previous signal to the radio reception station and a beam number of the beam selected by the radio reception station.

20. The radio communication method according to claim 12, wherein the relative value is the difference between the beam number of the beam utilized by the radio transmission station for the reception signal and the beam number of the beam selected for the future transmission.

* * * * *